(12) United States Patent
Serra et al.

(10) Patent No.: US 10,227,064 B2
(45) Date of Patent: Mar. 12, 2019

(54) ANTILOCK BRAKING SYSTEMS, DEVICES, AND METHODS USING SENSORIZED BRAKE PADS

(71) Applicant: ITT Italia S.r.l., Barge (CN) (IT)

(72) Inventors: Stefano Serra, San Pietro Val Lemina (IT); Luca Martinotto, Legano (IT); Daniele Donzelli, Luserna San Giovanni (IT); Marco Terranova, Turin (IT)

(73) Assignee: ITT ITALIA S.R.L., Barge (CN) (IT)

( * ) Notice: Subject to any disclaimer, the term of this patent is extended or adjusted under 35 U.S.C. 154(b) by 114 days.

(21) Appl. No.: 15/448,381

(22) Filed: Mar. 2, 2017

(65) Prior Publication Data
US 2017/0267220 A1 Sep. 21, 2017

(30) Foreign Application Priority Data

Mar. 3, 2016 (IT) .................. 102016000022599

(51) Int. Cl.
*G01C 21/00* (2006.01)
*B60T 8/52* (2006.01)
(Continued)

(52) U.S. Cl.
CPC ............... *B60T 8/52* (2013.01); *B60T 8/171* (2013.01); *B60T 8/172* (2013.01);
(Continued)

(58) Field of Classification Search
CPC .... B60T 8/52; B60T 8/17636; B60T 8/17616; B60T 8/172; B60T 8/171;
(Continued)

(56) References Cited

U.S. PATENT DOCUMENTS 2,289,954 A 7/1942 Arndt, Jr.
4,484,280 A 11/1984 Brugger et al.
(Continued)

FOREIGN PATENT DOCUMENTS

DE 100 06 012 A1 9/2000
DE 10230008 1/2004
(Continued)

OTHER PUBLICATIONS

European Search Report; European Application No. EP 14158449; dated Aug. 6, 2014.
(Continued)

*Primary Examiner* — Ian Jen
(74) *Attorney, Agent, or Firm* — Knobbe, Martens, Olson & Bear LLP

(57) ABSTRACT

Various antilock braking systems, devices, and methods using sensorized brake pads are disclosed. In some embodiments, the present disclosure provides a method for improving the performance of an antilock braking (ABS) and anti-slip regulation (ASR) system of a vehicle. The method can include detecting the actual value of the coefficient of friction (e.g., between a tire and the ground), updating the coefficient of friction during braking using the braking torque data derived from at least one braking pad of each wheel, and adjusting brake force. For example, the brake force can be adjusted as a function of and/or to be approximately equal to the value of the actual tire-road friction during braking.

32 Claims, 9 Drawing Sheets

(51) Int. Cl.

| | | |
|---|---|---|
| *B60T 8/171* | (2006.01) | |
| *B60T 8/172* | (2006.01) | |
| *B60T 8/1761* | (2006.01) | |
| *B60T 8/1763* | (2006.01) | |
| *F16D 65/092* | (2006.01) | |
| *F16D 66/00* | (2006.01) | |

(52) U.S. Cl.
CPC ...... *B60T 8/17616* (2013.01); *B60T 8/17636* (2013.01); *F16D 65/092* (2013.01); *F16D 66/00* (2013.01); *B60T 2210/124* (2013.01); *F16D 2066/005* (2013.01)

(58) Field of Classification Search
CPC .. B60T 2210/124; F16D 65/092; F16D 66/00; F16D 2066/005
See application file for complete search history.

(56) References Cited

U.S. PATENT DOCUMENTS

| | | | |
|---|---|---|---|
| 4,495,434 | A | 1/1985 | Diepers et al. |
| 4,649,370 | A | 3/1987 | Thomason |
| 4,782,319 | A | 11/1988 | Dell'Acqua et al. |
| 5,099,962 | A | 3/1992 | Furusu et al. |
| 5,115,162 | A | 5/1992 | Leonard et al. |
| 5,302,940 | A | 4/1994 | Chen |
| 5,660,215 | A | 8/1997 | Nishikawa et al. |
| 5,719,577 | A | 2/1998 | Pitot et al. |
| 6,204,786 | B1 | 3/2001 | Bieth et al. |
| 7,124,639 | B1 | 10/2006 | Kurtz et al. |
| 7,127,948 | B2 | 10/2006 | Tavares et al. |
| 9,415,757 | B2 | 8/2016 | Martinotto et al. |
| 2004/0187591 | A1 | 9/2004 | Baumann et al. |
| 2005/0029056 | A1 | 2/2005 | Baumgartner et al. |
| 2006/0254868 | A1 | 11/2006 | Thiesing et al. |
| 2007/0024113 | A1 | 2/2007 | Thrush |
| 2009/0133971 | A1 | 5/2009 | Baier-Welt |
| 2009/0157358 | A1 | 6/2009 | Kim |
| 2010/0211249 | A1* | 8/2010 | McClellan ............ G07C 5/006 701/31.4 |
| 2010/0250081 | A1* | 9/2010 | Kinser ...................... B60T 8/00 701/70 |
| 2014/0311833 | A1* | 10/2014 | Martinotto ............ F16D 65/08 188/1.11 E |

FOREIGN PATENT DOCUMENTS

| | | |
|---|---|---|
| DE | 10243127 A1 | 3/2004 |
| DE | 10 2005 052630 A1 | 3/2007 |
| DE | 10 2006 018 952 | 10/2007 |
| DE | 10 2006 053 489 | 5/2008 |
| DE | 10 2010 010482 A1 | 8/2011 |
| EP | 0 189 076 A2 | 7/1986 |
| EP | 0 601 681 A1 | 6/1994 |
| EP | 0 744 558 A1 | 11/1996 |
| EP | 1431606 A1 | 6/2004 |
| EP | 1530037 A1 | 5/2005 |
| EP | 1531110 | 5/2005 |
| EP | 1923592 B1 | 5/2008 |
| EP | 2741063 A1 | 6/2014 |
| EP | 2 778 462 A1 | 9/2014 |
| EP | 2570691 A1 | 10/2014 |
| FR | 2 815 040 A1 | 4/2002 |
| GB | 2309057 | 7/1997 |
| GB | 2 372 825 A | 9/2002 |
| GB | 2478423 | 9/2011 |
| JP | H11 94707 A | 4/1999 |
| JP | 2006-193091 | 7/2006 |
| KR | 2009 0057640 A | 6/2009 |
| KR | 10-2004-48957 | 6/2010 |
| KR | 2011 0043849 A | 4/2011 |
| WO | WO 2014/170726 | 10/2014 |
| WO | WO 2014/170849 | 10/2014 |
| WO | WO 2016/038533 A1 | 3/2016 |

OTHER PUBLICATIONS

International Search Report; International Application No. PCT/IB2015/056861; dated Jan. 18, 2016.
International Search Report; International Application No. PCT/IB2014/060778; dated Aug. 6, 2014.
International Search Report; International Application No. PCT/IB2013/060881; dated Jul. 3, 2014.
Italian Search Report and Written Opinion for Italian Patent Application No. IT UB20151291; dated May 28, 2015; 7 pages.
Italian Search Report and Written Opinion for Italian Patent Application No. IT UB20151184; dated May 28, 2015; 7 pages.
Italian Search Report and Written Opinion for Italian Patent Application No. IT UB20151059; dated May 28, 2015; 7 pages.
Italian Search Report and Written Opinion for Italian Patent Application No. IT UB20151029; dated May 28, 2015; 8 pages.
Italian Search Report, IO 58761 (IT UB20153706), dated May 25, 2016, 8 pages.
Italian Search Report, IO 58837 (IT UB20153709), dated May 31, 2016, 7 pages.
U.S. Appl. No. 15/167,883, 2017/0002883, Jan. 5, 2017.
U.S. Appl. No. 15/184,806, 2017/0030424, Feb. 2, 2017.
U.S. Appl. No. 15/268,179, 2017/0082164, Mar. 23, 2017.
U.S. Appl. No. 15/268,039, 2017/0082163, Mar. 23, 2017.
International Search Report and Written Opinion; International Application No. PCT/EP2017/054455, filed on Feb. 27, 2017; dated May 3, 2017.
U.S. Appl. No. 15/167,883 and its entire file history, filed May 27, 2016, Donzelli et al.
U.S. Appl. No. 15/184,806 and its entire file history, filed Jun. 16, 2016, Martinotto et al.
U.S. Appl. No. 15/268,179 and its entire file history, filed Jun. 16, 2016, Serra et al.
U.S. Appl. No. 15/268,039 and its entire file history, filed Sep. 16, 2016, Serra et al.
Von Wagner, et al.; Active Control of Brake Squeal via "Smart Pads"; Oct. 10, 2004.
"The Next Generation of Hub Units"; SKF Group; 2012, www.vsm.skf.com; 32 pages.
Solyom, Stefan, et al.; "Synthesis of a Model-Based Tire Slip Controller"; 2004; Vehicle System Dynamics, pp. 475-499; http://dx.doi.org/10.1080/00423110512331 3868.
Gustafsson, Fredrik; "Slip-based Tire-Road Friction Estimation"; Automatica, 1997; vol. 33, No. 6; pp. 1087-1099.
Pasillas-Lepine, William; "Hybrid Modeling and Limit Cycle Analysis for a Class of Five-Phase Anti-Lock Brake Algorithms"; Feb. 1, 2006; vol. 44, No. 2; pp. 173-188.
Capra, D. et al.; An ABS Control Logic Based on Wheel Force Measurement. In: Vehicle System Dynamics; vol. 50, No. 12, pp. 1779-1796; http://porto.polito.it/2497487/.
Ait-Hammouda, Islam; "Jumps and Synchronization in Anti-Lock Brake Algorithms"; Oct. 2008, Japan, 7 pages; https://hal.archives-ouvertes.fr/hal-00525788.
Yi, Jingang; "Emergency Braking Control with an Observer-based Dynamic Tire/Rotation Friction Model and Wheel Angular Velocity Measurement"; Vehicle System Dynamics; 2003, vol. 39, No. 2; peg. 81-97.
Ray, Laura; "Nonlinear Tire Force Estimation and Road Friction Identification: Simulation and Experiments"; Automatica, vol. 33, No. 10, pp. 1819-1833; 1997.

* cited by examiner

ANTILOCK BRAKING SYSTEMS, DEVICES, AND METHODS USING SENSORIZED BRAKE PADS

CROSS REFERENCE

This application claims the benefit under 35 U.S.C. § 119 of Italian Patent Application No. 102016000022599, filed Mar. 3, 2016, the entirety of which is incorporated by reference herein.

BACKGROUND

Field

The present disclosure relates to antilock braking systems (ABS) and methods of performing ABS on a vehicle equipped with sensorized brake pads.

Description of Certain Related Art

A braking unit is a mechanical apparatus that diverts energy from a moving system, thereby reducing the motion of the moving system. A braking unit is typically used for slowing or stopping a moving vehicle, such as by friction between a generally non-rotating brake pad and a rotating brake disk or drum. The brake pad can be pressed against the brake disk or drum by a brake caliper. A braking unit may be equipped with ABS, which inhibits or prevents locking of the wheels of the vehicle.

SUMMARY OF CERTAIN FEATURES

Some braking units include sensorized brake pads. Typically, sensorized brake pads include sensors, such as pressure sensors. This can enable the brake pad to detect and/or measure the pressure and forces applied to the brake pad while it is installed on the vehicle. Sensorized brake pads can allow the vehicle to detect conditions that may cause abnormal wear, noise and/or vibration. The ability to measure the pressure and forces applied to the brake pad can provide the ability to adjust (e.g., optimize) an antilock braking and anti-slip regulation (ASR) system according to the data provided by the sensors in the sensorized brake pads.

In some embodiments, the present disclosure provides a device and method (e.g., control logic) for controlling an antilock braking system and anti-slip system. In some embodiments, the present disclosure provides a device and a method for improving the performance of an antilock braking and anti-slip regulation system of a vehicle. In some embodiments, the device and method allows for the substantially instant and real-time detection of the actual coefficient of friction of the tire in relation to the ground during the activation of the vehicle's brakes.

In some embodiments, the present disclosure provides a device and a method for improving the performance of an antilock braking and anti-slip system of a vehicle that allows for the use of further mechanical parts of the vehicle in order to provide additional data that is suitable for the management of the antilock braking and anti-slip system.

In some embodiments, the present disclosure provides a device and a method for improving the performance of an antilock braking and anti-slip system of a vehicle that allows for the updating in real-time of the actual coefficient of friction measurement during braking.

In some embodiments, the present disclosure provides a device and a method for improving the performance of an antilock braking and anti-slip system of a vehicle that allows for the continuous adjustment of the braking pressure profile of the vehicle to the value of the actual tire/ground coefficient of friction generated during the entire braking interval.

In some embodiments, the present disclosure provides a device and a method for improving the performance of an antilock braking and anti-slip system of a vehicle that allows for the setting of the optimal deceleration profile for the specific value of the actual coefficient of friction detected.

In some embodiments, the present disclosure provides a device and a method for improving the performance of an antilock braking and anti-slip system of a vehicle that allows the slippage and/or wheel speed and acceleration thresholds to be fixed in order to maintain an ideal deceleration profile.

In some embodiments, the present disclosure provides a device and a method for improving the performance of an antilock braking and anti-slip system of a vehicle that allows for improvement in the reliability of the control logic and in the performance thereof under all conditions of use.

In some embodiments, the present disclosure provides a device and a method for improving the performance of an antilock braking and anti-slip system of a vehicle that allows for an additional ABS system control parameter to be obtained in order to verify the actual stopping of the vehicle with respect to the ground or the sliding thereof with locked wheels in order to record the actual system operating conditions.

In some embodiments, the present disclosure provides a device and a method for improving the performance of an antilock braking and anti-slip system of a vehicle that can be applied to many types of vehicles equipped with any ABS, ASR, ESC (Electronic Stability Control), torque-vectoring, collision avoidance and/or autonomous driving systems.

In some embodiments, the present disclosure provides device for improving the performance of an ABS and/or ASR and/or electronic stability control (ESC) system for a vehicle. Some embodiments include at least a fluid-dynamic system for controlling braking pressure and at least one ABS management control unit. Some embodiments comprise a brake-servo unit and a fluid pressure pump, solenoid valves connected to pipes for oil or air. Some embodiments have phonic wheels and tachometer sensors, such as one for each wheel of the vehicle. In some embodiments, the device comprises sensors associated with at least one of the brake pads acting upon the brake disk of a respective wheel in order to gather additional data. Some embodiments include at least one dedicated ECU control unit for managing said additional data and interacting with at least said ABS control unit.

In some embodiments, the present disclosure provides a method for improving the performance of an ABS and ASR system of a vehicle. The method can include detecting the actual value of the coefficient of friction (e.g., between a tire and the ground), updating (e.g., regularly and/or substantially constantly) the coefficient of friction during braking using the braking torque data derived from at least one braking pad of each wheel, and adjusting brake force (e.g., the hydraulic braking system pressure profile). For example, the brake force can be adjusted as a function of and/or to be approximately equal to the value of the actual tire-road friction during braking. Various embodiments include modulating a braking actuator, such as a valve, motor, or otherwise.

The devices, systems, and methods described herein have several innovative aspects, no single one of which is indispensable or solely responsible for their desirable attributes. Neither the Summary above, nor the Detailed Description below, nor the associated drawings, should be interpreted to limit the scope of the claims. No feature, element, or step is required or essential.

BRIEF DESCRIPTION OF THE DRAWINGS

Various embodiments are depicted in the accompanying drawings for illustrative purposes, and should in no way be interpreted as limiting the scope of this disclosure. Various features of different disclosed embodiments can be combined to form additional embodiments, which are part of this disclosure. Additional features and benefits of the present disclosure will become more evident from the description below.

DETAILED DESCRIPTION OF CERTAIN EMBODIMENTS

Figure 1:
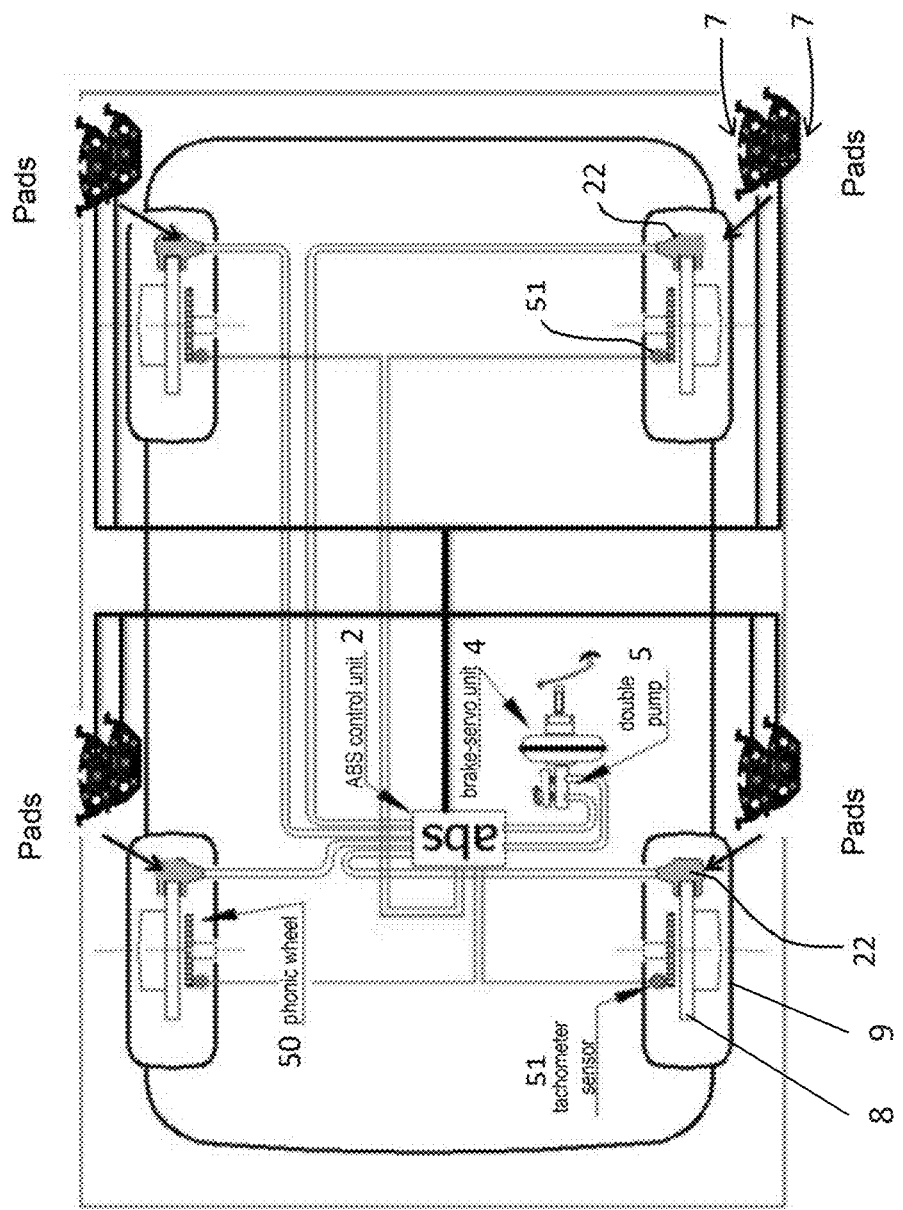
FIG. 1 is a schematic view of an ABS braking system equipped with sensorized brake pads.

In the following detailed description, reference is made to the accompanying drawings, which form a part hereof. In the drawings, similar reference numbers typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. The aspects of the present disclosure, as generally described herein, and illustrated in the figures, may be arranged, substituted, combined, and designed in a wide variety of different configurations, all of which are explicitly contemplated and made a part of this disclosure.

Braking System Overview

Antilock braking systems (ABS) typically aim to avoid the locking of vehicle wheels in response to excessive actuation of the brake. This can be especially useful on slippery ground. ABS systems can facilitate, within the limits of physical possibility, maintaining control over the vehicle. Furthermore, with an ABS system, exploitation of the forces of adhesion between the tires and the ground is improved. This can reduce the deceleration characteristics and braking distance of the vehicle.

However, during a braking event on slippery ground, due to the reduced values of friction between the tire and the ground, the braking force transmitted by the braking system to the wheels of the vehicle easily exceeds the value of the force of friction between the tire and the ground, with the result that the wheels lock. In this situation, the tires simply slide with respect to the ground only with the dynamic tire/road value of friction (low). The tires typically can transmit little lateral guiding force, e.g., the steering and pitch forces, with the consequence that the vehicle is no longer controllable, and the braking distance greatly increases.

Some antilock braking systems can provide more stable braking behavior, preserve steering capacity, and usually shorten the braking distance. Moreover, ABS systems can reduce tire wear. However, current antilock braking systems cannot completely neutralize the limits of traveling physics which may be the actual vehicle speed and the actual tire/ground coefficient of friction measured in substantially real-time.

Some vehicles include an anti-slip regulation systems (ASR). ASR systems are particularly useful in motor vehicles in unloaded or partially loaded commercial vehicles since, in the presence of ground with poor adhesion, an excessive increase in engine power or acceleration easily leads to the maximum force of adhesion on one or all of the drive wheels being exceeded, with the consequence of slipping.

The application of the ASR system on a vehicle typically requires an electronic control unit expanded for the ASR function, and some additional components for adjusting the differential braking and driving force, to transform an ABS system into a complete ABS/ASR adjustment device. Therefore, the ASR system is typically only available in combination with the ABS system.

In summary, it can be stated that the ABS system depends upon the coefficient of friction which is generated between the tire and the ground and is influenced by the condition of the ground and the state of the tires, by the load on the wheels or on the axles, by the vehicle speed, by the temperature and by the angle of drift of the tires or by the lateral guidance force.

Some ABS systems have a fixed sensor connected to the axle. This sensor, with the aid of the phonic wheel, continuously detects the respective rotary movement of the wheel. The electrical pulses generated within the sensor are transmitted to the electronic ABS control unit, which then determines the speed of the wheel. At the same time the electronic ABS control unit, according to a determined operating mode, can detect a reference speed that is almost equivalent to the actual speed of the vehicle. This speed may, for example, be detected by GPS, or by an on-board accelerometer from which the speed of the vehicle can be reconstructed. However in both cases, such a measurement typically has a low degree of precision. From all of this information the electronic ABS control unit continuously determines the acceleration values of the wheel, or the wheel delay and braking slippage values. In the case of a given value of slippage being exceeded, the amount of pressure applied to the braking pads is adjusted, thereby maintaining the wheel in an acceptable slipping range.

Consequently ABS and ASR systems typically can only analyze the data and information transmitted by those mechanical parts of the vehicle that are currently designated for this purpose. By way of example, some ABS/ASR systems cannot detect errors that cause roadholding failure and pressure loss that can only be identified within the scope of correctly checking the braking system as per the respective errors of the other braking devices.

The control logic of some ABS systems is based upon three different types of variables, e.g., the estimated speed of the vehicle, the angular rotation of the wheels and the angular acceleration of the wheels. With regard to estimating speed, a GPS unit or the accelerometer on-board the vehicle is used, or the speed of the vehicle is estimated on the basis of the "fastest diagonal" value (e.g., based upon the maximum value of estimated speed from the rotational speed of the wheels on two diagonals, the right front wheel and the left rear wheel, and vice versa). The angular rotations and accelerations of the wheels are typically obtained by direct acquisition using the aforementioned sensor and phonic wheel.

Some ABS control logic is problematic because the technique for estimating the actual speed is not effective, especially at low speed (20 km/h) and/or with low braking pressure. Some ABS control logic is problematic because the elements for measuring the coefficient of friction are estimates. This can be because the maximum slippage and the longitudinal forces depend upon (i) the coefficient of friction, which can continuously vary and (ii) the accuracy of the estimators of the speed of the vehicle and of the phonic wheel which estimates the speed and the angular acceleration of the vehicle wheel. Regarding point (i), determining the coefficient of friction can be especially difficult in braking applications on slippery surfaces, such as ice, and/or in conditions wherein one pair of wheels is on a low-adhesion surface and the second pair on a high adhesion surface (called a "μ-split" condition), and/or when an abrupt change in adhesion of the ground occurs during the use of the brakes (called a "μ-jump" condition). Regarding point (ii), various strategies and algorithms are used to improve the measurement of vehicle speed as a function of the speed of rotation and angular acceleration of the wheel. In some cases, algorithms make use of Kalman filtering techniques in combination with the particular use of an especially refined Tyre model in order to estimate the tire-road friction and slippage values, which are then used to refine the final estimate. However, these algorithms are still only estimates that can repeatedly fail, such as on slippery surfaces or due to tire wear and aging effects thereof, for which reason the data tends to become less accurate and the errors within the data managed by the ABS controller increase.

Technology based upon force measurements directly on the wheel has been developed by SKF using force sensors integrated into the wheel bearing (e.g., accelerometers and strain gauges). However, this has not had a practical application, especially given that the data collected are subject to inaccuracies arising from the fact that the measurable forces are very small and therefore difficult to detect with high accuracy compared to the forces acting upon the wheel while driving the vehicle. This problem can also occur with force sensors (e.g., accelerometers) embedded within a tire, wherein the longitudinal forces are great but there is considerable inaccuracies and uncertainty concerning the data collected due to, for example, wear and tear of the tires and noise coming from vibration of the tire rolling on the road.

This disclosure provides systems, devices, and methods for improving the performance of an antilock braking (ABS) and/or anti-slip regulation (ASR) system of a vehicle. The system can include an oil or air fluid-dynamic system for controlling the braking pressure. As shown in FIG. 1, the device can include an ABS control unit 2, a brake-servo unit 4, and a pump 5 (e.g., a hydraulic oil or air pressure pump). In some configurations, the system includes solenoid valves and brake lines, such as for oil or air. Some variants include phonic wheels 50 and tachometer sensors 51, respectively, such as for each wheel 9 of the vehicle. The ABS control unit 2 may include the control unit for the ASR system. Thus, although certain features are described herein in the context of an ABS system, this disclosure is applicable to an ABS/ASR system as well. Further, hereinafter, reference will be made to a motor vehicle equipped with disc brakes, but this disclosure is applicable to drum brakes with brake shoes or other types of frictional elements. This disclosure can be used in connection with any type of vehicle, such as cars, trucks, trailers, cranes, airplanes, or otherwise.

In several embodiments, the system includes sensorized brake pads 7. For example, as shown in FIG. 1, sensors 6 can be associated with at least one brake pad acting upon the brake disk 8 of each wheel 9 for the measurement of data. In some configurations, the data may include information regarding normal and/or shear forces experienced by the brake pad 7 when the brake pad 7 contacts the brake disk 8, for example, during a braking application.

The system can have at least one dedicated ECU or ABS control unit 2 for the management of data (e.g., from the sensors 6) and/or for interacting with the ABS and/or ASR control unit. In some configurations, the ABS control unit 2 comprises a processor and memory that are connected together and configured to receive and process data from the sensors 6 and perform ABS/ASR control. The processor can be any of a wide variety of processors, such as a microprocessor or other processor without limitation. The memory can be any of a wide variety of storage media, whether or not removable, and can include one or more arrays of RAM, ROM, EPROM, EEPROM, FLASH, or otherwise. The memory can have stored therein a number of routines that are executable on the processor to cause the ABS and/or ASR control unit(s) to perform the ABS/ASR control.

Figure 2:
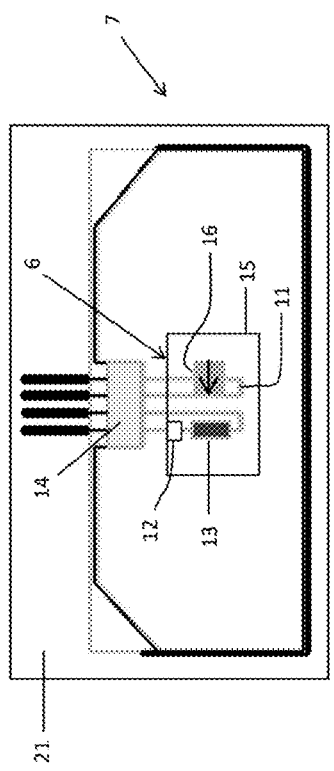
FIG. 2 is a schematic view of a sensorized brake pad.

With reference to FIG. 2, an example sensorized brake pad 7 is illustrated. As shown, in some configurations, the sensors 6 comprise an electronic circuit 11 integrated into the backplate of the pad 7. Preferably, the electronic circuit 11 is obtained by screen-printing and that is resistant to high temperatures near to or above 300° C. The electronic circuit 11 can include a piezoceramic shear force sensor 12 and/or a temperature sensor 13. The sensor 12 can be configured for use at high temperatures, such as at least about 200° C. (Curie temperature) and preferably with an operating temperature that is greater than or equal to about 300° C. In certain embodiments, the temperature sensor 13 (e.g., a PT1000 sensor), has an operating temperature of greater than or equal to about 300° C. The sensors 12, 13 can be arranged on the backplate of the pad 7, such as in specific positions of the screen-printed circuit 11. The sensors 12, 13 can be soldered in position. To close the electronic circuit and allow for connection to external electronic systems, a connector 14 can be provided. The connector 14 can facilitate transmitting the signals generated by the shear force 12 and temperature sensors 13 integrated into the backplate. To facilitate electrical insulation and mechanical protection, a protective cover 15 can be placed over said sensors 12, 13 and any conductive part of the circuit 11. The protective cover 15 can be implemented, for example, by forming "domes" made of resin or ceramic insulating materials over the sensors 12, 13. In some embodiments, the electronic circuit 11 comprises a shear force sensor 16. The shear sensor 16 can be positioned at the pressure center of the pad 7 based upon the dimensions and geometric form thereof. Preferably, the temperature sensor 13 is located near (e.g., adjacent to) to the shear sensor 16. In some implementations, the temperature sensor 13 may be used for the purposes of compensation (e.g., due to thermal expansion or otherwise). In some embodiments, one or more of the components of the sensorized brake pad 7 are embedded within the friction material of the pad 7 or, if present, within an under-layer. In this case, the friction material will lie above the under-layer. Additional information about sensorized brake pads can be found in U.S. Pat. No. 9,415,757, filed Dec. 13, 2013, and U.S. Patent Application Publication No. 2017/0002883, filed May 27, 2016, the entirety of each of which is incorporated by reference herein.

In FIG. 2, an arrow on the shear sensor 16 displays the direct polarization direction that is aligned parallel to the tangential forces applied to the pad 7 during a braking application, the forces of which are directly related to the braking torque measurements. This is just one possible solution, insofar as the relative positions of the sensors can be changed or other additional sensors can be added. For example, a pair(s) of piezoceramic pressure sensors could be positioned close to the upper corners of the rectangle representing the backplate 21, in order to measure the orthogonal force transmitted by the caliper piston to the pad during braking applications. In some configurations, bi-axial or tri-axial piezoelectric sensors can be used in order to supply more information than a single shear force sensor 12. These additional sensors can have an auxiliary function, such as being used to adjust (e.g., optimize) the distribution of pressure and/or to determine the disk-pad coefficient of friction in order to increase (e.g., optimize) braking efficiency.

In various embodiments, the control unit 2 can include operational logic and can be physically separate from the ABS control unit or integrated into the ABS control unit. The control unit 2 can have physical and/or analog inputs for the data signals detected by the brake pads. In some configurations, the control logic of the present disclosure (described in more detail below) may be integrated into current commercially available ABS control units and ABS systems. In various embodiments, the control unit 2 interacts (e.g., interfaces) with the ABS control unit. The control unit 2 can have a CPU or a data processing unit with real-time processing capabilities and a digital communication interface, for example CANBUS, and logic that is designed to integrate the signals from the brake pads both physically and in terms of data that need be integrated into the processing algorithms and into the control logics of the ABS control unit.

Figure 3:
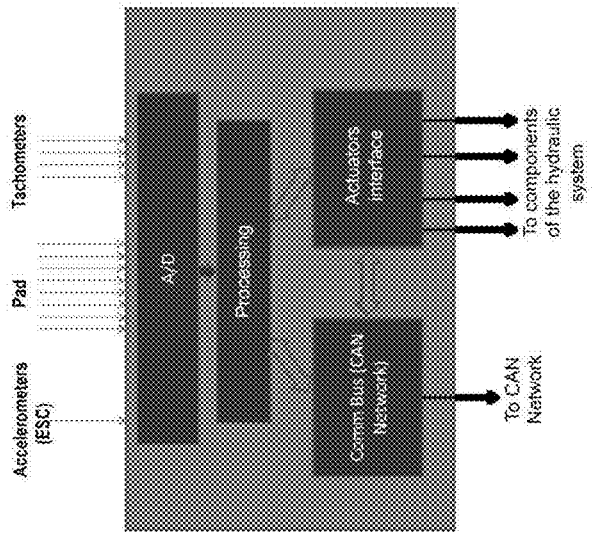
FIG. 3 is a schematic view of an ABS control unit.

FIG. 3 illustrates an example of the control unit 2. As shown, the control unit 2 can include inputs (e.g., from accelerometers, from the brake pad sensors, and/or from tachometers). The control unit 2 can include an analog-to-digital converter and a processor. The control unit 2 can include a CANBUS interface. The control unit 2 can include an actuator interface, such as outputs to actuators of the braking system. As shown, the processor and/or the CANBUS interface and/or the actuator interface can be in communication.

The information provided by the data from the pad 7, with regard to the ABS application, can include the braking torque applied during braking of the corresponding wheel 9 of the vehicle. This may be measured in substantially by the pad 7 using the shear sensor 16. The reason for this is linked to the longitudinal forces that act upon the tire/ground contact area (e.g., tire contact patch) during all braking applications, and that determine the dynamics of the wheel and therefore of the vehicle.

Control Logic Overview

There are typically two forces acting upon the wheel within the tire/ground contact area during the application of braking on smooth and flat terrain: (i) the force due to the braking torque applied during braking by the friction of the brake pads against the disk, and (ii) the tire/ground contact surface reaction force, which is affected by the amount of friction between the tire and the ground.

In the absence of traction forces, or the ground having a negative or positive slope (e.g., a road grade), the following equation defines the motion of the wheel:

$$|M_f| = |F_x|R_w - J\frac{d\omega}{dt} \qquad \text{(Equation 1)}$$

Where:
$F_x$=the longitudinal braking force;
$R_w$=the effective radius of the wheel;
$M_f$=the braking moment applied by the shear forces against the brake disks, which is the sum of the braking torque provided by both of the intelligent brake pads 7 of the same caliper 22;
J=the moment of inertia of the wheel 9; and
$\omega$=the angular velocity of the wheel 9.

According to Equation 1, at the time when the wheel 9 begins to lock, the torque and the moment of the longitudinal forces within the tire/ground contact area is equal. Therefore, we can conclude that with these assumptions and under these conditions, and with $F_x=\mu N$, where N is the known vertical load on the wheel 9 and $\mu$ is the tire/ground coefficient of friction, the braking torque when the wheel 9 locks will be directly related to the tire/ground force of friction.

The relationship between the braking torque and the force of friction between the tire and the ground is defined by the following equation:

$$M_{f\_lim} = \mu N \gamma = f(\mu) \qquad \text{(Equation 2)}$$

Where:
$M_{f\_lim}$ is the braking torque moment limit;
N is the known vertical load on the wheel 9;
$\mu$ is the tire/ground coefficient of friction; and
$\gamma$ is a constant in a first approximation.

According to Equations 1 and 2, the coefficient of friction $\mu$ may be calculated at the time when the wheel 9 begins to lock. The longitudinal braking force $F_x$ at the time when the wheel 9 begins to lock (calculated in Equation 1) can be used to calculate the coefficient of friction $\mu$ in Equation 2. The value of $\mu$ from Equation 2 can be called "$\mu$-slide," which is the ratio between the longitudinal braking force $F_x$ and vertical load N when the wheels are locked. Generally, $\mu$-slide differs from what is called "$\mu$-peak," which is the ratio between the longitudinal braking force $F_x$ and vertical load N when the longitudinal braking force $F_x$ assumes a maximum value during braking at the time before the wheels lock and/or the locking of the wheels is verified. Nevertheless, $\mu$-slide is typically related to $\mu$-peak, and can therefore provide a basis for determining and/or approximating (e.g., estimating) the $\mu$-peak value. In some embodiments, the value of the measured coefficient of friction $\mu$ (based on the actual longitudinal braking force $F_x$ at the time when the wheel 9 begins to lock) is directly related to the value of µ-peak.

In several embodiments, this disclosure provides methods (e.g., control logic) for controlling an ABS system. Some embodiments include a method of determining the coefficient of friction µ based on wheel slip. This may be referred to as "slip-based ABS" control logic. In some implementations, the slip-based ABS control logic provides ABS control of the wheel 9 that is determined based on slip, acceleration, and peripheral velocities. The slip-based ABS control logic can set ABS parameters used by the ABS control logic. In various embodiments, the parameters can be adjusted (e.g., optimized) to correspond to the actual value of the tire-road friction coefficient µ. In certain implementations, the coefficient of friction µ can be based on the actual longitudinal braking force $F_x$ at the time when the wheel 9 begins to lock.

Some embodiments include a "wheel locking" test. The wheel locking test detects whether the vehicle is stationary or whether the wheels are slipping while locked during braking and the vehicle is not stationary. This can happen, for example, when the control logic of an ABS fails on a slippery surface such as snow and ice. In some implementations, the value of $M_{f\text{-}lim}$ that is determined in Equation 2 enables the system to determine whether the wheels 9 are slipping and/or whether the wheels 9 are locked while the vehicle is in motion. In some embodiments, when the vehicle is stationary, the angular velocity of the wheels ω equals 0 and the value of $M_{f\text{-}lim}$ equals 0 or is very small, for example less than 1 Nm. When the wheels are locked but slipping against the road and the vehicle is not stationary, the angular velocity of the wheels ω equals 0 and the braking moment $M_{f\text{-}lim}$ does not equal 0 and usually much larger than 0, for example, tens of Nm for small values of µ (µ~0.2).

In several embodiments, the present disclosure provides a method for a "torque-based ABS" control logic. In some embodiments, the torque-based ABS control logic involves measuring the longitudinal braking force $F_x$ at substantially the time when an abrupt change in the coefficient of friction µ is detected during a braking application. An abrupt change in the coefficient of friction may be, for example, from a low µ value to a high µ value, such as when a surface transitions from low friction to high friction. An abrupt change in the coefficient of friction µ may be detected based upon the abrupt change in the slope of the wheel's angular velocity ω(t) detected during an application of the braking, when approaching $M_{f\text{-}lim}$ for example, where the braking forces tend to become larger than the forces of friction available within the ground/tire contact area.

Figure 4:
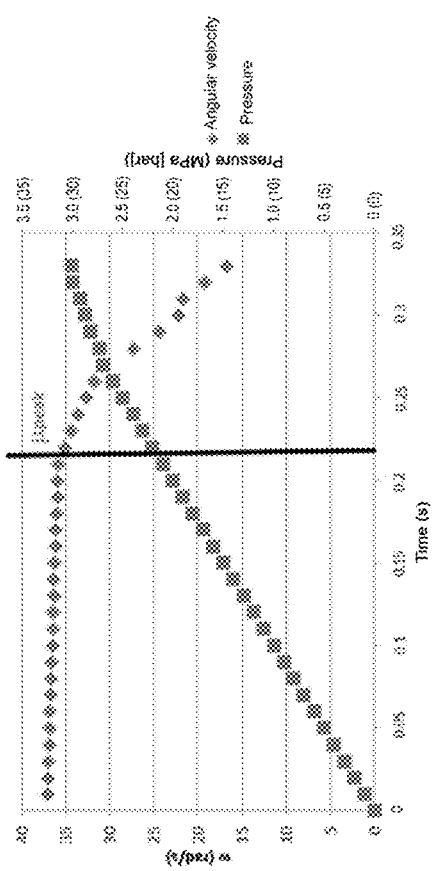
FIG. 4 is a graph illustrating the change in angular velocity of a wheel and hydraulic pressure in a brake caliper during an example braking application.

As can be seen in FIG. 4, the hydraulic pressure in the caliper 22 initially increases almost linearly while the corresponding values of angular velocity decrease. In the absence of sliding within and around the tire tread area, the condition of pure rolling (low slippage values) implies that the forces within the tire/ground contact area due to the braking torque and those forces from the friction with the ground will be equal and opposite. This will be true up to the value of µ-peak for longitudinal forces corresponding to the tire/ground contact area. From this point on, any increase in braking pressure (and therefore the braking torque) will no longer be offset by the forces of friction.

The consequence will be the observation of a sudden and rapid change in the slope of the curve ω(t) due to an imbalance between the braking torque and the moments of the forces of friction, as seen in FIG. 4 corresponding to the black vertical solid line. From this basic observation, the control unit 2 obtains the correct value of $M_{f\text{-}lim}$ and can operate according to the following steps: (i) detect the wheel's angular velocity ω(t) during the application of braking, (ii) check for abrupt changes in the slope of the curve ω(t) for example when the maximum reference threshold is exceeded, and (iii) consider $M_{f\text{-}lim}$ to be the torque value M just before the change in the slope of the curve of ω(t). In some implementations, in the torque-based ABS control logic the pressure is released before tire locking occurs. This can enable the torque-based ABS control logic to determine a µ value that is closer and/or approximately equal to the actual µ-peak value (e.g., compared to the slip-based ABS control logic).

In some variants, after the new value of $M_{f\text{-}lim}$ is determined, the control unit 2 repeats the same steps using the same procedure described above. This can enable the unit to obtain the final value of µ-peak. The µ-peak value can be used, in place of an estimation based upon models and algorithms, to determine friction in ABS control units.

In view of the above, the control logic of the control unit 2 based upon the data received from the pad 7 can include two distinct methods: a method based upon slippage, and a method based upon torque. In certain implementations, such control logic can provide at least the following benefits: (i) friction estimators for estimating the coefficient of friction between the tire-road are replaced with actual measurements of the braking torque limit and the coefficient of friction µ; and (ii) the effective tire-road friction is continually updated in substantially real-time during a braking application. The braking torque data sensed from the pads 7 can be used to dynamically adjust the braking pressure profile to approximately the value of the actual measurements of the coefficient of friction µ during a braking application. In some implementations, the result is a braking application that is continually adjusted (e.g., optimized) in substantially real-time to utilize the available friction between the tire and the road (as opposed to a static and/or predetermined estimation of the coefficient of friction µ). In some embodiments, the ABS control logic of the present disclosure provides faster dynamic response to changing friction conditions or abnormal situations.

Figure 5:
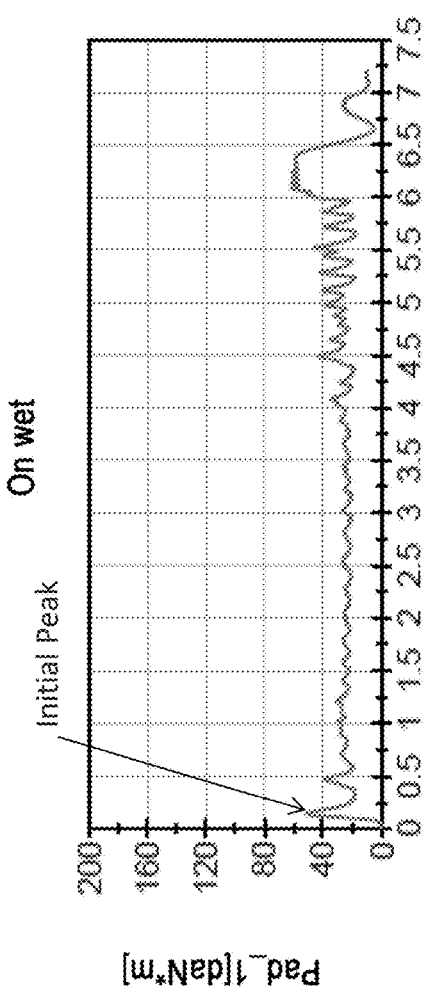
FIG. 5 is a graph illustrating the braking torque curve that is sensed by the sensorized brake pads during an example braking application.

FIG. 5 illustrates a profile of a torque curve obtained from a pad 7 calibrated at 1 kHz during a braking application with ABS at an initial speed of 30 km/h on a slippery surface (tire/ground coefficient of friction of approximately µ=0.2). The actual value of the coefficient of friction µ as explained above is obtained after the initial braking application phase, when the braking torque is increased up to the point of locking the wheels. In some embodiments, the actual longitudinal braking force $F_x$, which is used to determine the actual coefficient of friction is measured at the beginning of a braking application and/or when a coefficient of friction changes. The initial peak of the torque curve in FIG. 5 indicates a braking torque limit $\tau_{lim}$ for the available friction between the tire and the road.

After the identification of the value of the braking torque limit $\tau_{lim}$, the reference value for the available friction µ is determined by the control unit 2. In some embodiments, this determination is made with a function $\mu(\tau_{lim})$ that can be derived from the vertical load on the wheel and other parameters relating to the properties of the vehicle state's braking system, as described above. The braking torque limit $\tau_{lim}$ and the available friction are registered by the control unit 2 and can be used as a reference for the control logic of the ABS control unit 2. For example, the braking torque limit $\tau_{lim}$ and the available friction µ can be used to: (i) set the ideal deceleration profile for that specific value of μ; and/or (ii) set the slippage, speed, and/or acceleration thresholds of the wheels in order to maintain the ideal deceleration profile.

Figure 6:
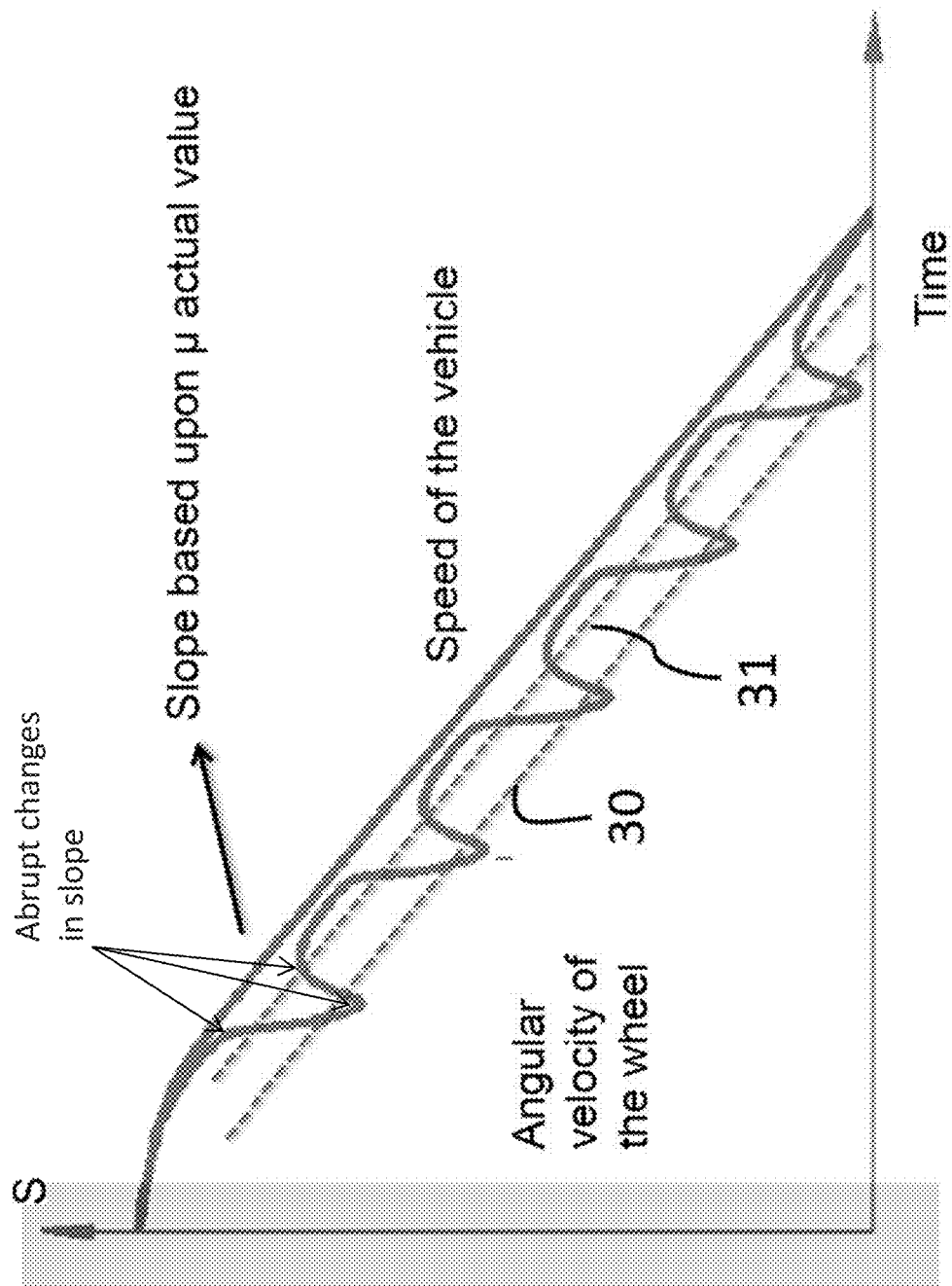
FIG. 6 is a graph illustrating the angular velocity curve of the wheel during an example ABS operation.

FIG. 6 illustrates a profile of wheel speed over time while braking pressure modulation is performed in order to keep the deceleration close to an acceptable (e.g., ideal) deceleration curve based upon the actual measured value of $\mu(\tau_{lim})$. The pressure modulation can be obtained by threshold lines (based on slippage or speed of rotation) in order to open and close the hydraulic valves of the hydraulic system connected to the ABS control unit. These reference lines for the peripheral speed of the wheel (rotational speed of the wheel) are marked with 30 and 31 and with dashed lines in FIG. 6.

The reference lines 30, 31 indicate thresholds for the activation of the hydraulic pressure control valves. In particular, when the threshold indicated by 30 is exceeded, the braking pressure is increased, and when the threshold indicated by 31 is exceeded, the braking pressure is decreased. A similar logic can also be obtained using the peripheral acceleration rather than the velocity of the wheel, with corresponding value thresholds for the acceleration.

Whenever changes occur to the coefficient of friction the control logic in the control unit 2 is capable of retrieving an updated value of $\mu(\tau_{lim})$. For changes of the value of a decreasing the updated value of $\mu(\tau_{lim})$ is retrieved by taking the new $\tau_{lim}$ for the wheel locking condition (which is less than the previous value), and determining the updated $\mu(\tau_{lim})$. This updated value is used to generate an updated set of parameters for the control logic of the control unit 2. This updated set of parameters will, for example, provide an updated deceleration objective, which may include an updated slope of the vehicle speed curve, updated speed thresholds and/or updated acceleration thresholds. This updated set of parameters will be used to update the preceding ones and used in the control logic of the control unit 2 to replace the previous parameters.

In certain implementations, the ABS control logic of the present disclosure recognizes a μ-jump condition in which the value of μ increases during a braking application. For example, the actual coefficient of friction may change if the road transitions from wet to dry, ice to wet, etc. during a braking application. The ABS control logic recognizes a μ-jump condition by, for example, introducing a periodic increase in the peripheral deceleration of the wheel by a periodic increase in the modulation pressure in order to test for the increase in when applying the brakes. This could be performed, for example, with a period of 0.1 s, according to the desired or required degree of response for the ABS control logic. The ABS control logic may also recognize a μ-jump condition by determining a change in the slope of the peripheral speed curves during normal pressure modulations. In fact, an increase in the value of μ may cause a reduction in the angular velocity modulations of the wheel 9 during a braking application, and therefore this specific condition in variation could be used in order to enable the procedure for a new determination of $\tau_{lim}$.

In certain aspects, the present disclosure describes systems, devices, and methods that use algorithms (e.g., the equations discussed above or otherwise) to solve one or more technological problems. For example, as described in more detail elsewhere in this disclosure, data from the sensorized brake pad (e.g., normal force, tangential force, and/or torque values) can be used to determine certain ABS parameter data, such as approximately the actual coefficient of friction between the wheel and the ground and/or the amount of braking force that the frictional forces between the wheel and the ground will support (e.g., substantially without the wheel sliding). The sensorized brake pad data can be provided to a computing device (e.g., a processor and a memory), which can repeatedly determine the ABS parameter data. The disclosed systems, devices, and methods can transform the sensorized brake pad data into tangible technological improvements of braking systems. For example, compared to certain current ABS systems, several embodiments can significantly decrease vehicle stopping distance, facilitate vehicle control, and/or increase safety.

Slip-Based ABS Control Logic

As previously mentioned, some embodiments include a slip-based ABS control logic. The slip-based ABS control logic can be performed by the control unit 2. In various embodiments, the slip-based ABS control logic can increase the efficiency of the ABS system, such as by reducing the distance required to bring the vehicle to a stop. Various embodiments of the slip-based ABS control logic can be used with existing ABS systems, such as by retrofitting a vehicle with the sensorized brake pads 7 and with the control logic described herein.

Figure 7:
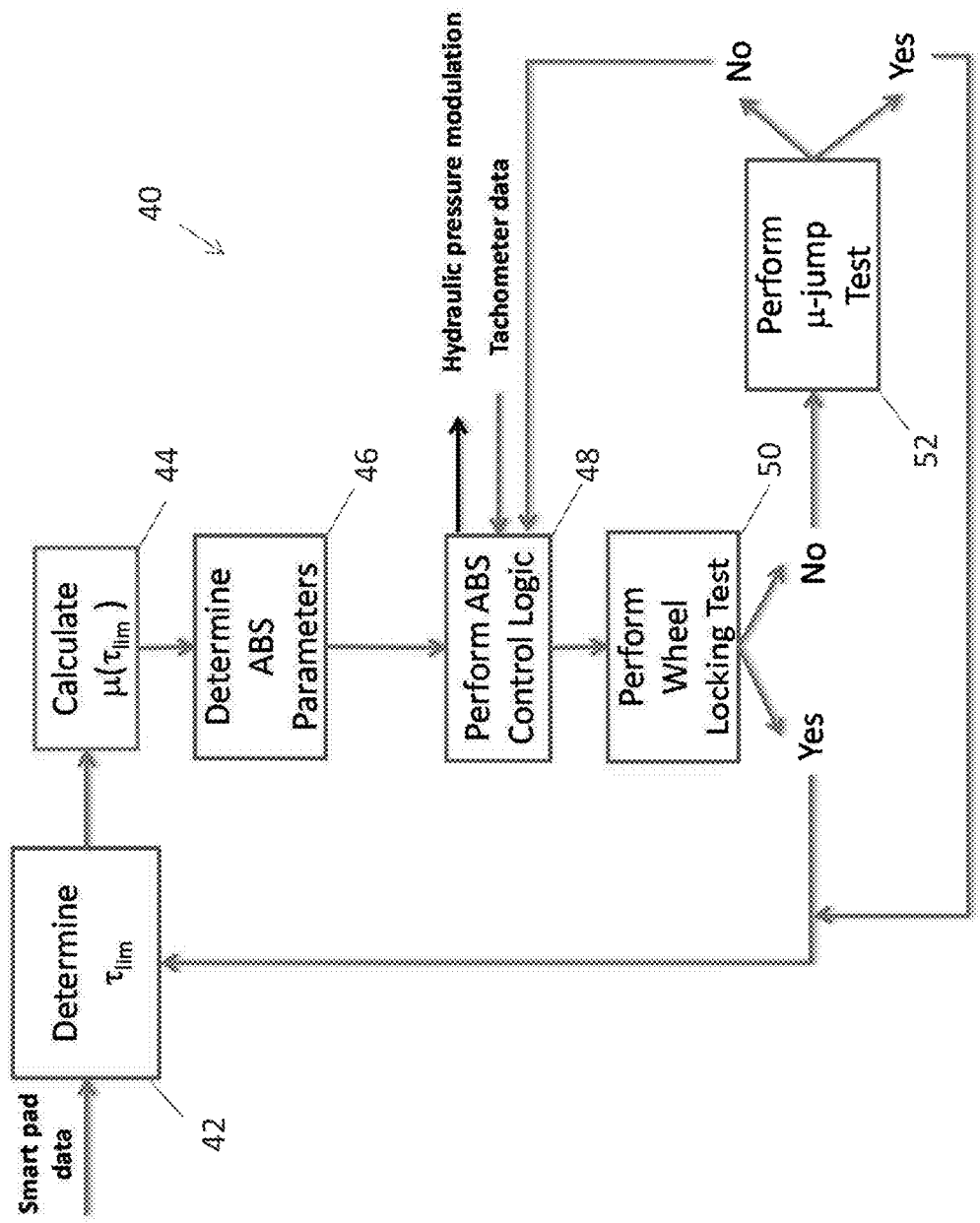
FIG. 7 is a flowchart illustrating a slip-based ABS control scheme.

FIG. 7 illustrates an example of a slip-based ABS control logic 40. In block 42, the braking torque limit $\tau_{lim}$ is determined. In some embodiments, the maximum value of the braking torque performed at the start of the application of the braking, or as a result of a change to the tire/ground coefficient of friction μ is determined based on data obtained by the sensorized brake pad 7. In certain embodiments, in block 42, the pad data generated based on the braking conditions sensed by the sensorized brake pads 7 is received by the control unit 2 and is used to determine the braking torque limit $\tau_{lim}$. The pad data may include information regarding shear force, normal force, temperature, or other information that is sensed by the sensors 12, 13 of the sensorized brake pad 7 during a braking application. The actual braking torque limit $\tau_{lim}$ for a braking application can be the braking torque at the initial peak of the torque curve, as indicated in FIG. 5. As discussed above, the initial peak of the torque curve in FIG. 5 indicates the actual braking torque limit $\tau_{lim}$ for the available friction between the tire and the road during the given braking application.

In block 44, the control unit 2 determines the coefficient of friction $\mu(\tau_{lim})$ based on the braking torque limit $\tau_{lim}$. In some embodiments, the coefficient of friction $\mu(\tau_{lim})$ can be determined using Equations 1 and 2, as described above. For example, the braking torque limit $\tau_{lim}$ determined in block 42 can be used to determine the coefficient of friction $\mu(\tau_{lim})$ by using Equations 1 and 2. Determining the coefficient of friction $\mu(\tau_{lim})$ based on the braking torque limit $\tau_{lim}$ can provide a more accurate determination of the available friction between the tire and the road compared to, for example, ABS systems that estimate the coefficient of friction (e.g., based on imprecise estimations of the vehicle speed, wheel speed, friction, etc.). In various embodiments, the coefficient of friction $\mu(\tau_{lim})$ is the actual coefficient of friction, rather than an estimate. In some implementations, determining the coefficient of friction $\mu(\tau_{lim})$ based on the braking torque limit $\tau_{lim}$ allows the ABS braking of the vehicle to be continually modulated (e.g., optimized) in substantially real-time according to the available friction between the tire and the road.

In block 46, the control unit 2 can determine and set ABS parameters for performing the ABS control logic during the braking application. In some embodiments, the ABS parameters for performing ABS braking during the braking application are determined and set based on the coefficient of friction $\mu(\tau_{lim})$ determined in block 44. The ABS parameters (e.g., $c_0, c_1, c_2 \ldots c_m$) used by the ABS control logic can be adjusted (e.g., optimized) for that specific value of µ. In some configurations, the ABS parameters may include thresholds for controlling a value, such as wheel speed, wheel acceleration, brake pressure, slip ratio, etc. In some configurations, the thresholds can comprise predetermined values and/or can be varied (e.g., optimized). The values and/or other parameters can be arranged in lookup tables for efficient use within the control logic.

In block 48, the control unit 2 performs the ABS control logic for providing ABS braking of the wheel 9 based on the ABS parameters determined in block 46. In certain embodiments, the ABS braking during the braking application is performed based on the ABS parameters determined using the coefficient of friction $\mu(\tau_{lim})$. In some configurations, the ABS control logic may control the vehicle braking system to modulate hydraulic pressure to the wheel 9. In some configurations, such as certain configurations utilizing electric or hybrid-electric powertrains, the ABS control logic may control the vehicle drive system to output a torque to the wheel 9 to control the velocity of wheel 9. In some configurations, data from tachometers from the phonic wheels (e.g., data from wheel-speed sensors) may be received by the control unit 2 and used to for providing ABS braking of the wheel 9.

In block 50, the control unit 2 performs a wheel locking test. This test can determine whether the vehicle is stationary or whether the wheels are locked and slipping such that the vehicle is not stationary. In some embodiments, the wheel locking test is performed by determining whether the angular velocity of the wheels ω equals 0 and the braking moment $M_{f\text{-}lim}$ equals 0. When the angular velocity of the wheels ω equals approximately 0, the wheel 9 is determined to be not rotating. When the braking moment $M_{f\text{-}lim}$ Inn equals approximately 0, the system determines that no braking torque is being applied to the brake rotor. In some configurations, the angular velocity of the wheels and/or the braking torque thresholds may be greater than 0, such as less than or equal to about 1 Nm. If both the angular velocity ω and braking moment are approximately equal to zero, or below their respective threshold values (YES at block 50), it is determined that the wheels are locked and the vehicle is stationary, and the process returns to block 42 to re-determine the braking torque limit $\tau_{lim}$. If one or both of the angular velocity ω and braking moment are not equal to approximately zero or above their respective threshold values (NO at block 50), it is determined that the vehicle is not stationary, and the process proceeds to block 52.

In block 52, the control unit 2 performs a µ-jump test to detect variations towards larger values of µ during braking applications. In some embodiments, the µ-jump test is performed on the basis of time or on the basis of condition (for example, depending upon peripheral speed variations detected with increased braking pressure). In some embodiments, the control unit 2 may periodically perform the wheel locking test by changing the braking limit torque $\tau_{lim}$ to determine whether the coefficient of friction $\mu(\tau_{lim})$ has changed. For example, the actual coefficient of friction may change if the road transitions from wet to dry, ice to wet, etc. during a braking application.

To perform the µ-jump test, the control unit 2 may incrementally vary brake pressure and/or modulation. In some configurations, an increase in the coefficient of friction $\mu(\tau_{lim})$ is detected, when no slippage and/or locking of the wheel 9 is detected. In some embodiments, if an increase in brake pressure and/or modulation does not cause slippage and/or locking of the wheel 9 then the available friction between the tire and the road has increased, which indicates an increase in the coefficient of friction and that a µ-jump condition has occurred and is detected. Accordingly, when a µ-jump condition is detected (YES at block 52), the process then returns to block 42 to re-determine the braking torque limit $\tau_{lim}$. This can enable the braking limit torque $\tau_{lim}$ to be increased and adjusted (e.g., optimized) to utilize the increased available friction between the tire and the road has increased. In some configurations, if an increase in brake pressure and/or modulation does not cause slippage and/or locking of the wheel 9, the braking limit torque $\tau_{lim}$ may be set at the incrementally increased value until the braking torque limit $\tau_{lim}$ is re-determined.

If an increase in brake pressure and/or modulation causes slippage and/or locking of the wheel 9, this indicates that the available friction between the tire and the road has not increased since the original value of the braking limit torque $\tau_{lim}$ was initially determined (initial peak of the torque curve in FIG. 5). In some embodiments, slippage and/or locking of the wheel 9 due to the brake pressure and/or modulation of the µ-jump test indicates that the available friction between the tire and the road was exceeded by the incremental increase in brake pressure and/or modulation. In some variants, the current coefficient of friction µ is not greater than coefficient of friction $\mu(\tau_{lim})$ previously determined and a µ-jump condition has not occurred. Accordingly, when a µ-jump is not detected (NO at block 52), the process returns to block 48 and the control unit 2 performs the ABS control logic for providing ABS braking of the wheel 9 based on the coefficient of friction $\mu(\tau_{lim})$ previously determined.

In some configurations, the µ-jump test may be performed at each wheel of the vehicle such that a µ-split condition may be detected. A condition occurs when the surface has different a coefficient of friction under the vehicle's left and right side wheels, for example, one wheel pair is on a low-µ surface and the second wheel pair is on a high-µ. If a condition is detected, the control unit 2 may adjust the braking torque of each wheel such that the vehicle is stable under braking. For example, in some configurations, the wheels on both right and left-sides of the vehicle may be braked according to the coefficient of friction $\mu(\tau_{lim})$ determined for the low-µ surface.

In some configurations, the µ-jump test may be triggered according to a function of time. For example, the µ-jump test may be performed in periodic time increments of, for example, 0.1 seconds. The time increments may short or longer depending on the responsivity desired for the ABS control logic. The µ-jump test may also be triggered based on vehicle state and/or road conditions. For example, the µ-jump test may be performed if the vehicle determines that the road is wet or icy via vehicle sensors (i.e., outside air temperature, operation of windshield wipers, etc.). Similarly, the frequency with which the µ-jump test is performed may also be increased. For example, if the road is determined to be wet or icy, the µ-jump test may be performed in periodic time increments of, for example, 0.05 seconds. Similarly, the amount, magnitude, frequency, etc. with which the brake pressure and/or modulation is varied may also differ depending upon vehicle state and/or road conditions. For example, when performing the µ-jump test, the amount with which the brake pressure is increased may be greater on wet roads and smaller on icy roads.

The overall control logic is an adaptive control scheme for an ABS system that makes use of an existing ABS control logic, but that improves it by the addition of a more refined ABS operation optimization based upon the actual braking torque value, and its variations during braking applications.

As a result, modulation (e.g., optimization) of the actual braking performance can be obtained. In some embodiments, the slip-based ABS control process 40 varies the application of ABS braking by determining and utilizing the actual coefficient of friction $\mu(\tau_{lim})$, as opposed to relying on estimations of the coefficient of friction of the tire-road. In some embodiments, the wheel locking test of the slip-based ABS control process 40 allows the ABS control unit 2 to determine whether a vehicle is actually stationary as opposed to sliding while the wheels are locked, without relying on speed and friction estimators (which are inaccurate and may fail at low velocities, low braking pressures and/or low μ surfaces). In some implementations, the μ-jump test of the slip-based ABS control process 40 allows the ABS control unit 2 to recognize the coefficient of friction of the road has increased during the braking application. Accordingly, the braking application may be adjusted to utilize the increase in the coefficient of friction of the road, which improves braking performance and decreases braking distances.

Torque-Based ABS Control Logic

Figure 8:
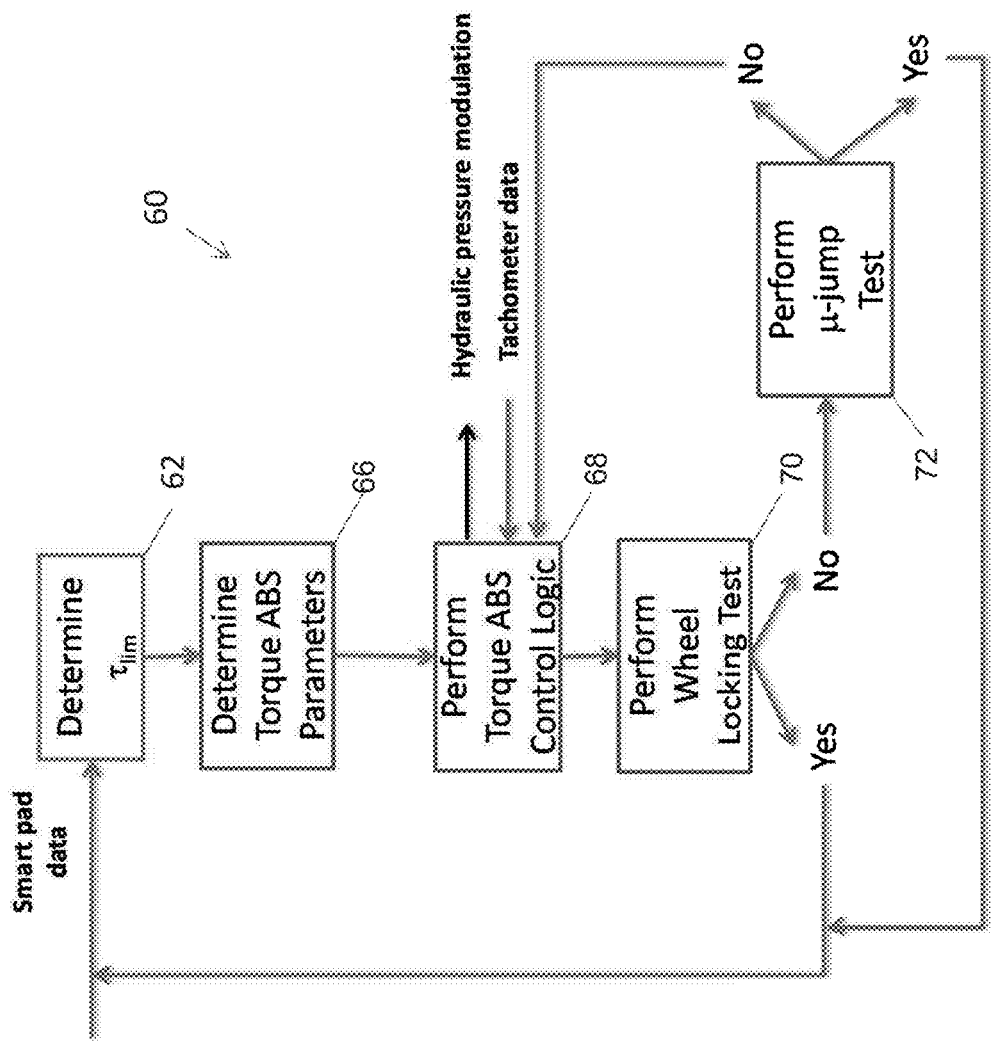
FIG. 8 is a flowchart illustrating a torque-based ABS control scheme.

As mentioned above, certain embodiments include a torque-based ABS control logic. The torque-based ABS control logic can be based on (e.g., a function of) the braking torque. In several embodiments, the torque-based ABS control logic can improve the reliability of the ABS system and performance under various conditions. FIG. 8 illustrates an example of the torque-based ABS control logic 60. The torque-based ABS control logic 60 can be performed by the control unit 2. The torque-based ABS control process 60 can be similar to the slip-based ABS control process 40 in some respects, and can include any of the features of the slip-based ABS control process 40. Certain embodiments of the torque-based ABS control logic 60 differ from the slip-based ABS control process 40 in some aspects, such as in certain calculations within and how they are used within the control logic.

The torque-based ABS control process 60 can be based upon the determination of the braking torque limit $\tau_{lim}$. The $\tau_{lim}$ value can provide the maximum value of braking torque, which is the value above which the slope of the curve of the angular velocity of the wheel abruptly changes while applying the braking. This torque value can be used as a reference value for the braking pressure modulation, which can occur using a specific command sent by the ABS control unit.

FIG. 8 illustrates an example of the torque-based ABS control logic 60. The torque-based ABS control logic 60 can be performed by the control unit 2. In block 62, the braking torque limit $\tau_{lim}$ is determined. In some embodiments, the evaluation of the limit value for the braking torque $\tau_{lim}$ is determined based on data obtained by the pad 7 at the start of the application of the braking or as a consequence of a variation in the tire/ground coefficient of friction. In some embodiments, in block 62, the pad data generated based on the braking conditions sensed by the sensorized brake pads 7 are received by the control unit 2. In contrast to block 42 (of the slip-based ABS control logic) where the braking torque limit $\tau_{lim}$ is the braking torque at the initial peak of the torque curve, in block 62 the angular velocity ω of the wheel 9 is monitored during an application of the braking to detect an abrupt change in the slope of the angular velocity curve ω(t). An abrupt change in the slope of the angular velocity curve ω(t) may be identified by a change in angular velocity (such as at least about 10 rad/s or other values) within a predetermined period of time (such as less than or equal to about 10 ms or other values). FIG. 6 illustrates abrupt changes in the slope of the angular velocity curve ω(t), as indicated with arrows.

In certain implementations, when an abrupt change in the slope is detected in the angular velocity curve ω(t), the value of the braking torque immediately before (such as within about 10 ms or other values) the change in slope is set as the braking torque limit $\tau_{lim}$. Using the change in slope to determine the braking torque limit $\tau_{lim}$, as opposed to determining whether the angular velocity curve ω(t) forms a peak, can provide a more accurate determination of the braking torque limit $\tau_{lim}$ (e.g., a value that is closer to the actual braking torque limit of the wheel 9). Using the change in slope can enable for a faster determination of the actual braking torque limit $\tau_{lim}$ of the wheel 9, since a change in slope of the angular velocity curve ω(t) may be substantially immediately detected.

In various implementations, in response to the detection of an abrupt change in the rotation of the wheel, the torque limit value $\tau_{lim}$ is updated. In some embodiments, in response to a sudden and rapid change in the slope of the curve ω(t), the value of the braking torque just before (such as within about 10 ms or other values) the sudden and rapid change in the slope of the curve ω(t) is set as braking torque limit $\tau_{lim}$. In some embodiments, when a sudden and rapid change in the slope of the curve ω(t) is detected, the value of the braking moment $M_{f-lim}$ just before the sudden and rapid change in the slope of the curve ω(t) is set as the torque value M.

In block 64, the control unit 2 can determine and set ABS parameters (e.g., $c_0, c_1, c_2 \ldots c_m$) for performing the ABS control logic during the braking application. The ABS parameters can be based on the braking torque limit $\tau_{lim}$. In some configurations, the ABS parameters may include thresholds slope values of the angular velocity curve ω(t) and/or the actual $\tau_{lim}$ value. In some implementations, the ABS parameters may be predetermined and used in the ABS control logic by lookup tables for efficient use within the control logic insofar as it is dependent upon the actual measured value for $\tau_{lim}$. This can reduce computational and system costs and to increase the calculation speed.

In block 66 of the torque-based ABS control process 60, the ABS parameters are determined directly based on the braking torque limit $\tau_{lim}$, which was determined in block 62. As such, the ABS parameters of the torque-based ABS control process 60 do not rely upon estimations of the vehicle speed, wheel speed, friction conversions, etc., which can be inaccurate and/or uncertain. Accordingly, inefficiencies from using such estimations are reduced or eliminated. In several embodiments, compared to the slip-based ABS control process 40, the braking torque determined by the torque-based ABS control process 60 is closer to the maximum allowable braking torque for the available friction between the tire and the road. This can significantly increase braking efficiency, as is discussed in more detail below.

Block 66 of the torque-based ABS control process 60 differs from block 46 (of the slip-based ABS control logic 40) in that, for example, the ABS parameters are determined from the braking torque limit $\tau_{lim}$, rather than the coefficient of friction $\mu(\tau_{lim})$. As discussed, the slip-based ABS control process 40 is intended to incorporate the advantages of utilizing the actual braking torque limit $\tau_{lim}$ with the ABS control logic of certain existing ABS systems, which use the braking torque limit $\tau_{lim}$ to determine the coefficient of friction $\mu(\tau_{lim})$, which in turn is used to determine the ABS parameters. In several embodiments, the torque-based ABS control process 60 determines the ABS parameters directly from the braking torque limit $\tau_{lim}$. This can reduce or eliminate inaccuracies that may be introduced by determining the ABS parameters with the coefficient of friction $\mu(\tau_{lim})$, such as inaccuracies from wheel speed estimations. As shown, some embodiments of the torque-based ABS control process 60 do not include calculating the coefficient of friction $\mu(\tau_{lim})$ and/or do not include a block that corresponds to block 44 of the slip-based ABS control process 40.

In block 68, the control unit 2 performs the ABS control logic for providing ABS braking of the wheel 9 based on the torque-based ABS parameters determined in block 66. In some embodiments, the ABS control logic regulates the pressure (e.g., hydraulic pressure) of the brakes to keep the braking torque approximately at the actual braking torque limit $\tau_{lim}$. In certain variants, the ABS braking during the braking application is performed based on the ABS parameters determined using the actual braking torque limit $\tau_{lim}$. Some implementations include a control on the variation in the slope of the single values of $\omega(t)$ during the braking application, such as measured by the phonic wheel without any reference to the estimate of the "true" speed of the vehicle. In certain embodiments, this can take account of changes in the coefficients of friction towards lower values that will be promptly compensated for by the control logic. In some embodiments, the control logic is linked with certain stability control features, such as electronic brake-force distribution (EBD). The general condition of stability where $\omega_{front} > \omega_{rear}$ (e.g., the front wheel turns at a higher speed than the rear wheel), can enhance the basic control logic for this new class of ABS control logic.

In block 70, the control unit 2 performs a wheel locking test. As discussed above, this test can determine whether the vehicle is stationary or whether the wheels are locked and slipping such that the vehicle is not stationary. The wheel locking test in block 70 of the torque-based ABS control process 60 can be similar to the wheel locking test in block 50 of the slip-based ABS control process 40.

In block 72, the control unit performs a μ-jump test to detect variations in μ toward higher values during braking applications. Some embodiments perform this test on the basis of time or on the basis of condition (for example, depending upon peripheral speed variations detected with increased braking pressure). In certain variants, the control unit 2 performs a μ-jump test to test for variations towards larger values of μ during braking applications. In certain implementations, the periodic evaluation of the presence of the μ-jump condition can be set, periodically increasing the braking pressure in order to perform the locked wheel test and thus changing (e.g., increasing) the new torque limit if the condition is verified, or continuing to use the previous limit if said condition is not verified. The μ-jump test in block 72 of the torque-based ABS control process 60 can be similar to the μ-jump test in block 52 of the slip-based ABS control process 40.

As has been discussed, unlike currently available ABS systems, the torque-based ABS control process 60 does not require estimating the speed of the wheel in order to modulate the brake pressure applied to the wheel. This is because the system can detect and determine the actual braking torque during the application of braking and can control such torque in substantially real-time. The torque-based ABS control logic 60 thus eliminates of inefficiencies that can occur from using incorrect or approximate estimations of the actual speed of the vehicle, which is then used in the control logic for controlling the braking intensity pressure. This can lead to a braking force that diverges from the maximum possible braking force that could be used, thereby increasing braking distance. In contrast, the torque-based ABS control logic 60 can enable the use of a braking force that is approximately equal to the maximum possible braking force that can be used over the whole braking distance. This can significantly reduce braking distance and can increase safety for persons inside and outside the vehicle. In various embodiments, torque-based ABS control logic 60 can reduce or avoid uncertainties relating to the estimation of the potential friction associated with the control logic of current ABS/ESC systems. Moreover, because the control unit 2 receives an additional control parameter (e.g., from the cross-check between $\omega$ and $\tau_{lim}$), the control unit 2 can perform additional operations. For example, the control unit 2 can verify that the vehicle has actually stopped (vehicle stationary with respect to the ground) and/or can test for the presence of slippage (wheels locked). This information can be used to recover from conditions that are not effectively recoverable with other ABS systems.

EXAMPLES

Figures 9, 10:
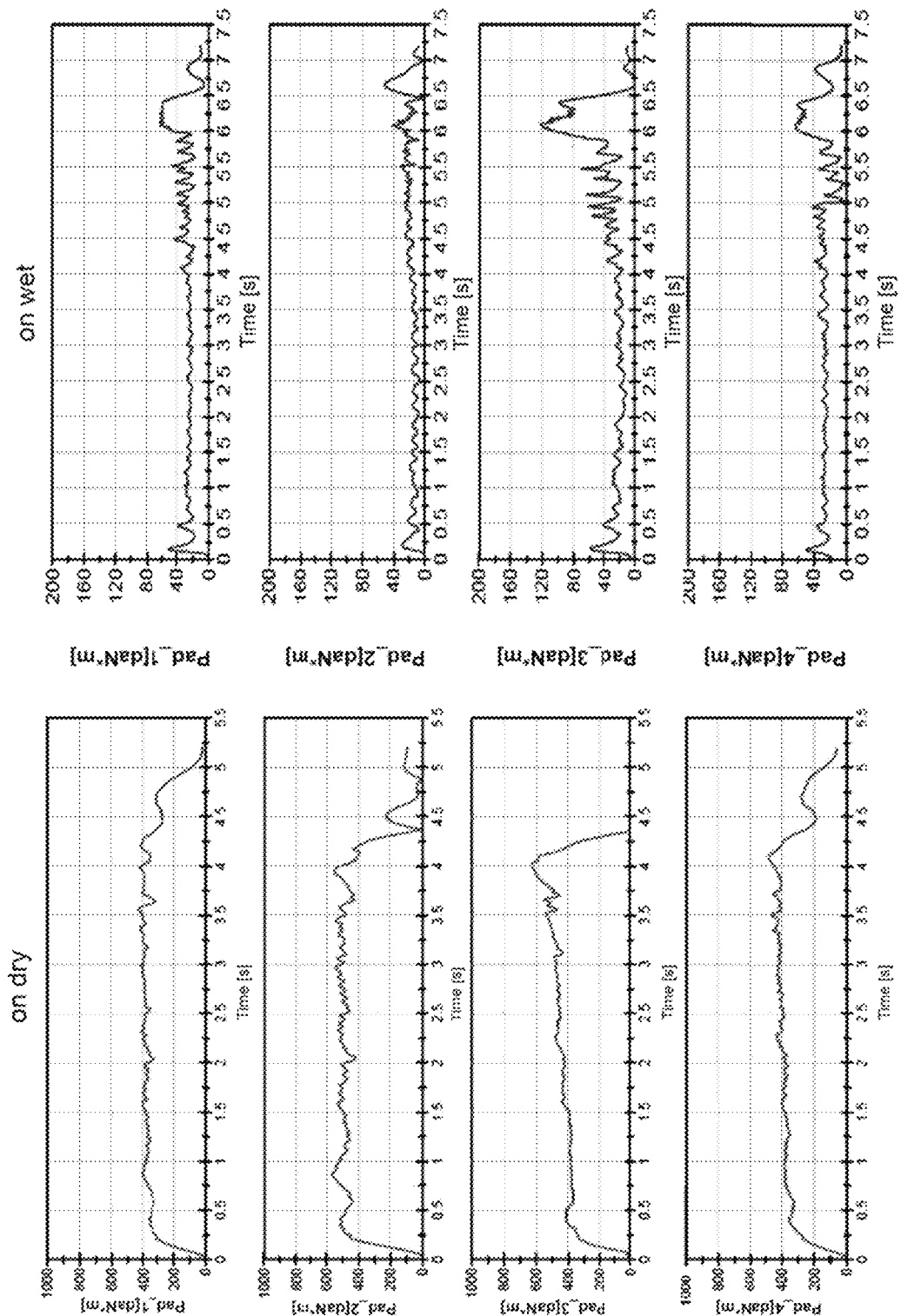
FIG. 9 is a series of graphs illustrating the braking torque curve during an example braking application on a dry road surface.
FIG. 10 is a series of graphs illustrating the braking torque curve during an example braking application on a wet road surface.

Devices and methods for improving the performance of an antilock and/or anti-slip system of a vehicle have been tested on a track. In the first set of results as shown by the graphs below, the trend of the torque measured by a sensorized brake pad is shown during a braking application with ABS under two different ground conditions. FIG. 9 shows the torque data measured by four pads 7 on the front wheels (two per caliper) under dry conditions. In this case, it is known that the surface has a coefficient of friction of about 1. During application of the braking force, the torque values are quite stable with small oscillations around an average value of about 400 daNm. Considering that the radius of the wheel is approximately 0.32 m, and taking the double data contribution provided by a pair of brake pads acting on that wheel, there is a longitudinal braking force within the total tire/ground contact area of about 5000 N. If we compare this value with Pacejka curves for longitudinal braking forces, we can see that this value is very close to the peak limit for longitudinal force for the values of the coefficient of friction close to 1. This indicates that the ABS is working well under these conditions. Nevertheless, improvements can be expected even with the application of the system according to the present disclosure.

FIG. 10 shows the corresponding torque results with the application of braking with ABS on slippery surfaces. In particular, a wet slippery surface is considered, which corresponds to a coefficient of friction of about 0.2 (between 0.1 and 0.2, but closer to 0.2). We can now see that the performance of the ABS system is very different. Compared to the dry conditions of FIG. 9, in the wet conditions of FIG. 10, the fluctuations are much greater and the stability of the torque is much lower. The average value of total torque at the wheel is about 64 daNm, corresponding to a total longitudinal force at the wheel of approximately 410 N.

Figure 12:
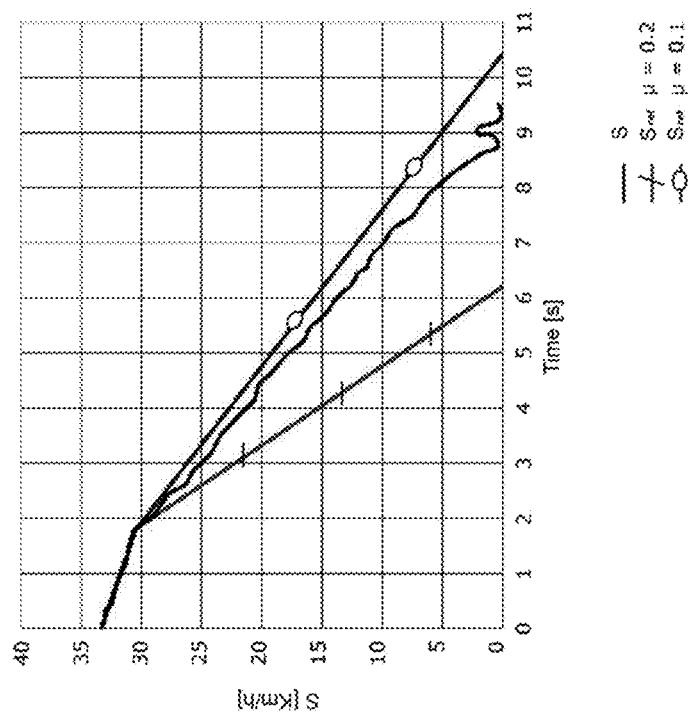
FIG. 12 is a graph illustrating the vehicle speed curve during an example braking application on a low friction road surface.
Figure 11:
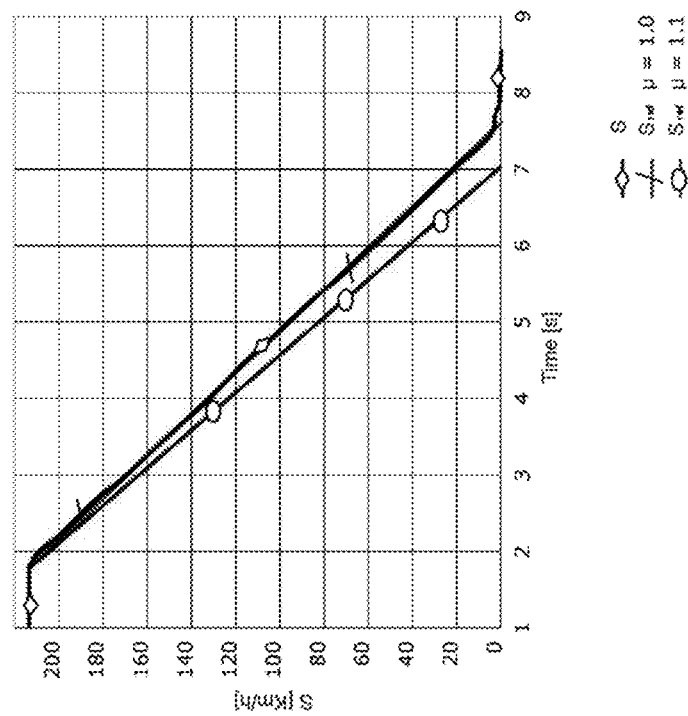
FIG. 11 is a graph illustrating the vehicle speed curve during an example braking application on a high friction road surface.

With reference to FIGS. 11 and 12, the vehicle speed measured during the tests is plotted. FIG. 11 illustrates the vehicle speed measured during the dry tests of FIG. 9 and FIG. 12 illustrates the vehicle speed measured during the wet tests of FIG. 10. FIG. 11 shows the ideal deceleration profiles for high friction values of 1.0 and 1.1, together with the actual speed profile of the vehicle during braking. FIG. 12 shows the ideal deceleration profiles for low friction values of 0.1 and 0.2, together with the actual speed profile of the vehicle during braking. As shown in FIG. 11, the ABS system kept the deceleration close to that expected for a coefficient of friction of about 1.0, which was close to the actual coefficient of friction, so in this case the friction estimator of the ABS system operated farily accurately. However, as can be seen in FIG. 12, the ABS system kept the deceleration close to a coefficient of friction of about 0.1, which was a substantial difference from the actual coefficient of friction of about 0.2. Thus, in this case, the friction estimator of the ABS system operated inaccurately. As shown, the braking time was increased.

With continued reference to FIG. 12, we can see the parallel between the line at a coefficient of friction of 0.1 and the actual speed profile at the central part of the graph. At the beginning and end, the slope of the actual speed profile becomes closer to the ideal slope of the deceleration profile with a friction value of 0.2. We can also see from the speed profiles that the friction estimation means of existing ABS systems fail to obtain the correct values of a low µ and that for most of the braking period this value is underestimated. From the torque perspective, it can be observed that at the beginning and end of the braking application the torque values were in fact larger with respect to the central portion, giving rise to greater braking force. This was not due to actual changes to the coefficient of friction of the ground, which was homogeneous and closer to 0.2. The test was conducted on an area of a particular test circuit for wet conditions, with known and controlled surface conditions. The underestimation can be attributed to the poor performance and inefficiency of the existing ABS control logic, as previously stated. In contrast, the ABS control schemes of the present disclosure, such as the torque-based ABS control logic 60, can avoid the use of such estimators, and thus can substantially increase braking performance.

Figure 14:
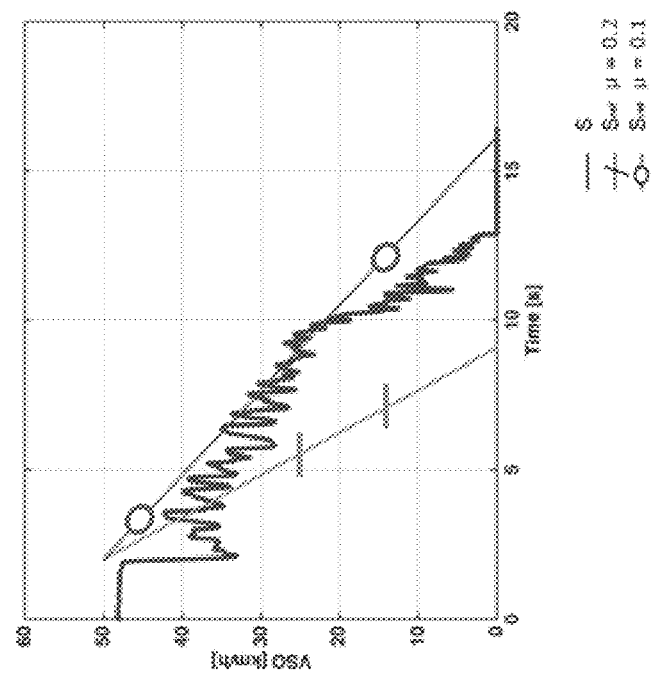
FIGS. 13 and 14 are graphs illustrating vehicle speed curves during an example braking application on a low friction road surface from an initial speed of about 50 km/h.
Figure 13:
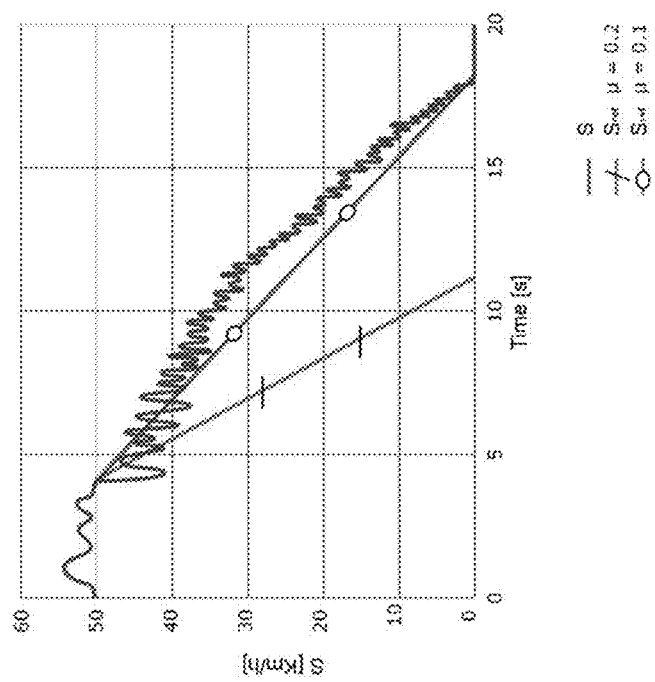

A further demonstration of the failures of certain existing ABS systems is shown in FIGS. 13 and 14. In these graphs, the results of two braking applications under the same conditions are shown (the same surface, the same coefficient of friction, the same car, the same commercial control logic and ABS system) obtained in quick succession in order to maintain identical conditions. As shown, the two ABS braking applications are very different and involve very different stopping times and therefore very different distances. In both cases the friction estimator operated poorly, underestimating the coefficient of friction for a substantial part of the braking period.

The main differences in the application of the two braking events are evident from the amount of time passed with an estimated value for the coefficient of friction that is closer to the actual value (0.2). In terms of braking distance, the overall effect of the underestimation of the coefficient of friction leads to an increase in the stopping distance of approximately 4 m at an initial speed of 30 km/h assuming an average value for the coefficient of friction of 0.15, while it will be 8 m if we assume a coefficient of friction of 0.2. For the case represented in FIGS. 13 and 14, there is an increase in the stopping distance of 10 m for the case in FIG. 13 and about 5 m for the case in FIG. 14 at an initial speed of 50 km/h.

The following table shows the results of the operating logic of the control unit 2 according to the present disclosure for an ABS system based upon an actual measurement of the coefficient of friction, compared to the control logic of an existing ABS system, in terms of braking distance with an initial speed of 100 km/h.

| µ Coefficient | Existing ABS Braking Distance (m) | ABS Control Unit of the Present Disclosure Braking Distance (m) | Difference % |
| --- | --- | --- | --- |
| 0.9 | 50.5 | 45.7 | −9.5% |
| 0.5 | 90.1 | 80.7 | −10.3% |
| 0.3 | 153.5 | 139.1 | −9.3% |

In terms of absolute distance the benefits obtained with the use of data from a brake pad 7 and the use of a control unit 2 greatly increases the control of the vehicle even with slippery ground surfaces while it tends to become negligible when the coefficient of friction, and therefore the control of the vehicle, increases with the recovery of adhesion on the ground.

Certain Terminology

Although certain devices, systems, and processes have been disclosed in the context of certain example embodiments, it will be understood by those skilled in the art that the scope of this disclosure extends beyond the specifically disclosed embodiments to other alternative embodiments and/or uses of the embodiments and certain modifications and equivalents thereof. Use with any structure is expressly within the scope of this present disclosure. Various features and aspects of the disclosed embodiments can be combined with or substituted for one another in order to form varying modes of the assembly. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Terms of orientation used herein, such as "top," "bottom," "proximal," "distal," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are to scale, but such scale should not be limiting, since dimensions and proportions other than what are shown are contemplated and are within the scope of the disclosed present disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

Summary

Various illustrative embodiments of devices, systems, and methods have been disclosed. Although the devices, systems, and methods have been disclosed in the context of those embodiments, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A system for performing braking of a wheel during a braking application of a vehicle, the system comprising:
    a sensorized brake pad comprising:
        a support element;
        a friction material attached to the support element;
        a force sensor positioned between the support element and the friction material, the force sensor configured to transmit signals corresponding to a force of the wheel during the braking application; and
    a computing system comprising a processor and a non-transitory storage, the computing system configured to:
        receive the signals from the sensorized brake pad;
        determine, using the signals from the sensorized brake pad, a braking torque limit value;
        determine, using the braking torque limit value, braking parameters of the wheel; and
        control, using the braking parameters, a brake pressure valve of the vehicle to modulate the brake pressure applied to the wheel speed.

2. The system of claim 1, wherein the processor determines a coefficient of friction based on the braking torque limit value.

3. The system of claim 1, the force sensor comprises a shear force sensor or a normal force sensor.

4. The system of claim 1, wherein the force sensor is embedded within or above an underlayer of the sensorized brake pad.

5. The system of claim 1, wherein the force sensor is embedded within the friction material of the sensorized brake pad.

6. The system of claim 1, further comprising a temperature sensor.

7. The system of claim 1, further comprising the brake pressure valve.

8. The system of claim 1, further comprising a wheel speed sensor configured to output a speed signal to the computing system, the speed signal corresponding to an angular velocity of the wheel.

9. A method of performing anti-lock braking of a wheel during a braking application of a vehicle, the method comprising:
    sensing, with a sensorized brake pad, a braking torque of the wheel;
    determining, with a processor, a braking torque limit value of the braking torque;
    determining, with the processor, a coefficient of friction based on the braking torque limit value;
    determining, with the processor, braking parameters during the braking of the wheel based on the coefficient of friction;
    controlling, with the processor, a braking actuator based on the braking parameters; and
    modulating, with the braking actuator, the wheel speed.

10. The method of claim 9, wherein the braking torque limit value is an amount of braking torque at an initial peak of the braking torque during the braking application.

11. The method of claim 9, wherein the determining of the braking torque limit value occurs at a beginning of a braking application or when a change in the coefficient of friction is determined.

12. The method of claim 9, wherein the braking parameters include thresholds for controlling at least one of wheel speed, wheel acceleration, brake pressure, or slip ratio.

13. The method of claim 9, wherein the determining of the braking parameters is performed without considering an estimated vehicle speed.

14. The method of claim 9, further comprising determining, with the processor, whether the vehicle is stationary.

15. The method of claim 14, wherein determining whether the vehicle is stationary comprises determining a wheel speed and the braking torque.

16. The method of claim 9, further comprising determining, with the processor, whether the coefficient of friction has changed during the braking application.

17. The method of claim 16, wherein determining whether the coefficient of friction has changed comprises:
    varying brake pressure or brake modulation; and
    determining whether the wheel slips due to the varying brake pressure or brake modulation.

18. The method of claim 16, wherein determining whether the coefficient of friction has changed is performed in periodic time increments during the braking application.

19. The method of claim 16, wherein determining whether the coefficient of friction has changed is performed based on a vehicle state or road conditions.

20. A method of performing anti-lock braking of a wheel during a braking application of a vehicle, the method comprising:
sensing, with a sensorized brake pad, a braking torque of the wheel;
determining, with a processor, a braking torque limit value of the braking torque;
determining, with the processor, braking parameters of the wheel during the braking based on the braking torque limit value;
controlling, with the processor, a braking actuator based on the braking parameters; and
modulating, with the braking actuator, the wheel speed.

21. The method of claim 20, wherein the braking torque limit value is an amount of braking torque at an initial peak of the braking torque during the braking application.

22. The method of claim 20, the method further comprising:
sensing, with a wheel speed sensor, an angular velocity of the wheel; and
determining, with the processor, a slope of the angular velocity of the wheel, wherein
when the determining of the braking torque limit value occurs is based on a change in the slope the angular velocity of the wheel.

23. The method of claim 20, wherein the braking parameters comprise thresholds for controlling at least one of wheel speed, wheel acceleration, brake pressure, or slip ratio.

24. The method of claim 20, wherein the determining of the braking parameters is performed without considering an estimated vehicle speed.

25. The method of claim 20, further comprising: determining, with the processor, whether the vehicle is stationary.

26. The method of claim 25, wherein determining whether the vehicle is stationary comprises determining a wheel speed and the braking torque.

27. The method of claim 20, further comprising determining, with the processor, whether the coefficient of friction has changed during the braking application.

28. The method of claim 27, wherein determining whether the coefficient of friction has changed comprises:
varying brake pressure or brake modulation; and
determining whether the wheel slips due to the varying brake pressure or brake modulation.

29. The method of claim 27, wherein determining whether the coefficient of friction has changed is performed periodically during the braking application.

30. The method of claim 27, wherein determining whether the coefficient of friction has changed is performed depending on a vehicle state or road conditions.

31. The method of claim 20, wherein sensing, with the sensorized brake pad, the braking torque of the wheel comprises: sensing, with a shear force sensor of the sensorized brake pad, the braking torque of the wheel.

32. The method of claim 20, further comprising sensing, with the force sensor of the sensorized brake pad, a normal force.

* * * * *